United States Patent [19]

Di Rosa

[11] Patent Number: 5,149,240
[45] Date of Patent: Sep. 22, 1992

[54] ADJUSTABLE STORAGE RACK

[75] Inventor: Gaetano Di Rosa, Turin, Italy

[73] Assignee: Fata Automation S.p.A., Turin, Italy

[21] Appl. No.: 640,813

[22] Filed: Jan. 14, 1991

[30] Foreign Application Priority Data

Jan. 15, 1990 [IT] Italy ............................ 19063 A/90

[51] Int. Cl.⁵ .............................................. B65G 1/04
[52] U.S. Cl. .................................... 414/277; 414/267
[58] Field of Search ................................ 414/267–283;
211/1.3, 1.5, , 171, 173, 191, 193

[56] References Cited

U.S. PATENT DOCUMENTS

| | | | |
|---|---|---|---|
| 2,675,133 | 4/1954 | Ostlund | 211/171 |
| 2,957,583 | 10/1960 | Busbridge | 211/171 |
| 3,734,312 | 5/1973 | Hickinbatham | 414/267 |

FOREIGN PATENT DOCUMENTS

| | | | |
|---|---|---|---|
| 40437 | 8/1965 | German Democratic Rep. | 414/267 |
| 9271 | 1/1977 | Japan | 414/267 |
| 136082 | 10/1979 | Japan | 414/267 |
| 121109 | 6/1987 | Japan | 414/277 |
| 474484 | 10/1975 | U.S.S.R. | 211/171 |

*Primary Examiner*—Edwin L. Swinehart
*Attorney, Agent, or Firm*—Finnegan, Henderson, Farabow, Garrett & Dunner

[57] ABSTRACT

A storage rack having shelving consisting of a plurality of risers connected by horizontal stringers to individualize an ordered plurality of compartments open at the front and arranged in rows and columns for receiving load units deposited and taken therefrom by extractable forks on a handling device moving along the shelving and positioning itself opposite the individual compartments. In each compartment there are placed at intervals on the side walls pluralities of brackets facing each other in pairs, the brackets being rotatable on pivots by an operating device, e.g. included in the handling device or in the structure of the shelving, between a raised or rest position and a lowered or support position for the load units inserted in the compartments. In this manner it is possible to adjust the distance between the supports for the load units to the height of the latter, thus optimizing space utilization of the rack.

3 Claims, 5 Drawing Sheets

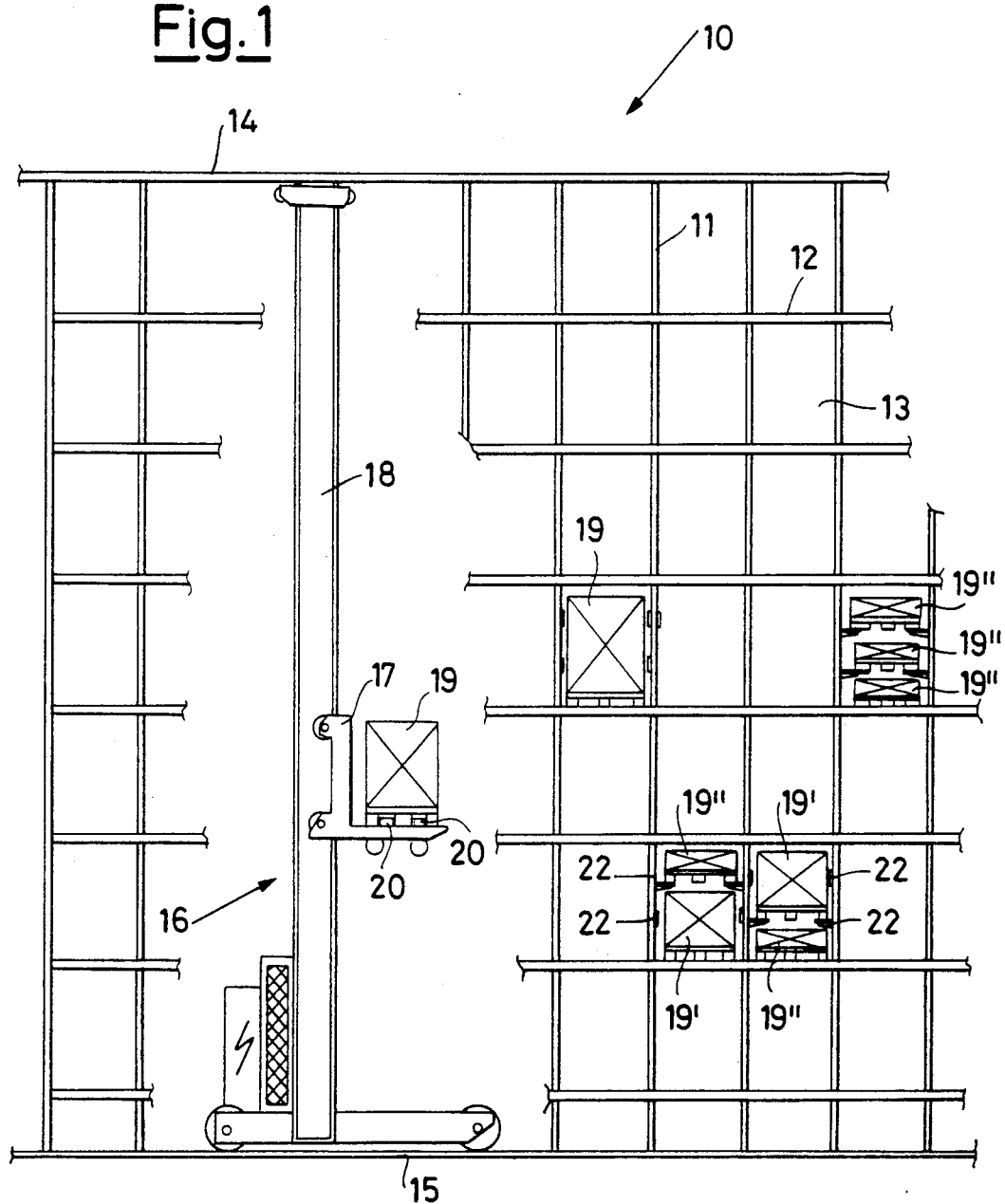

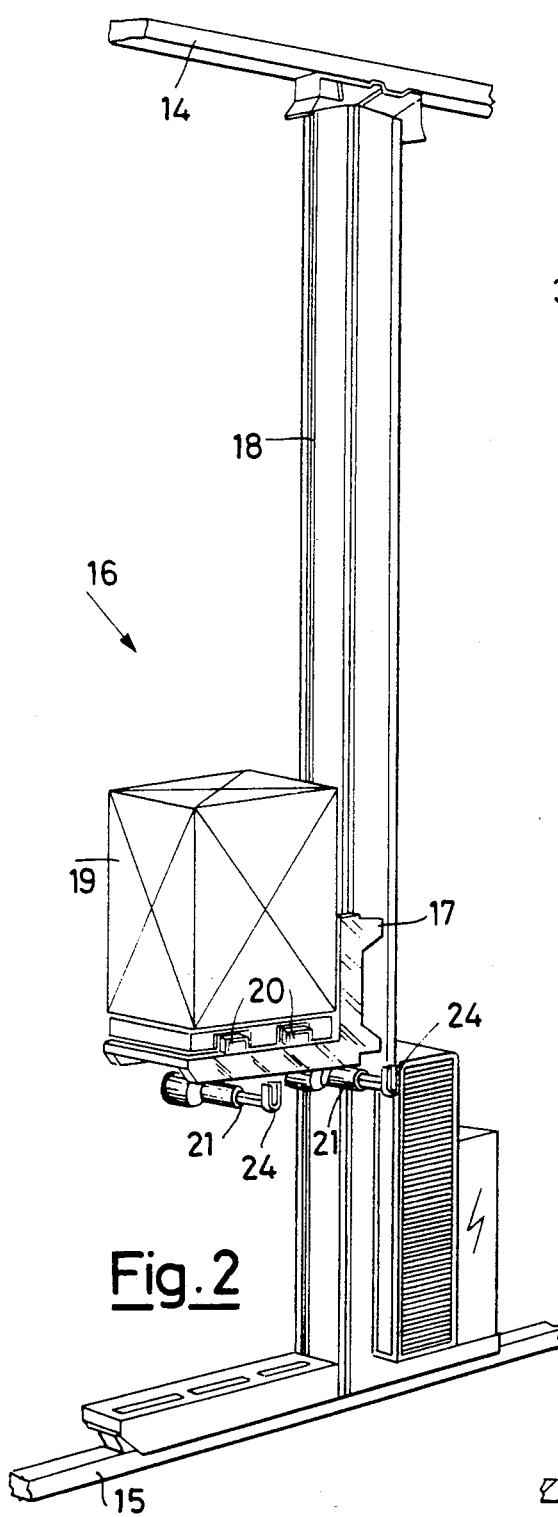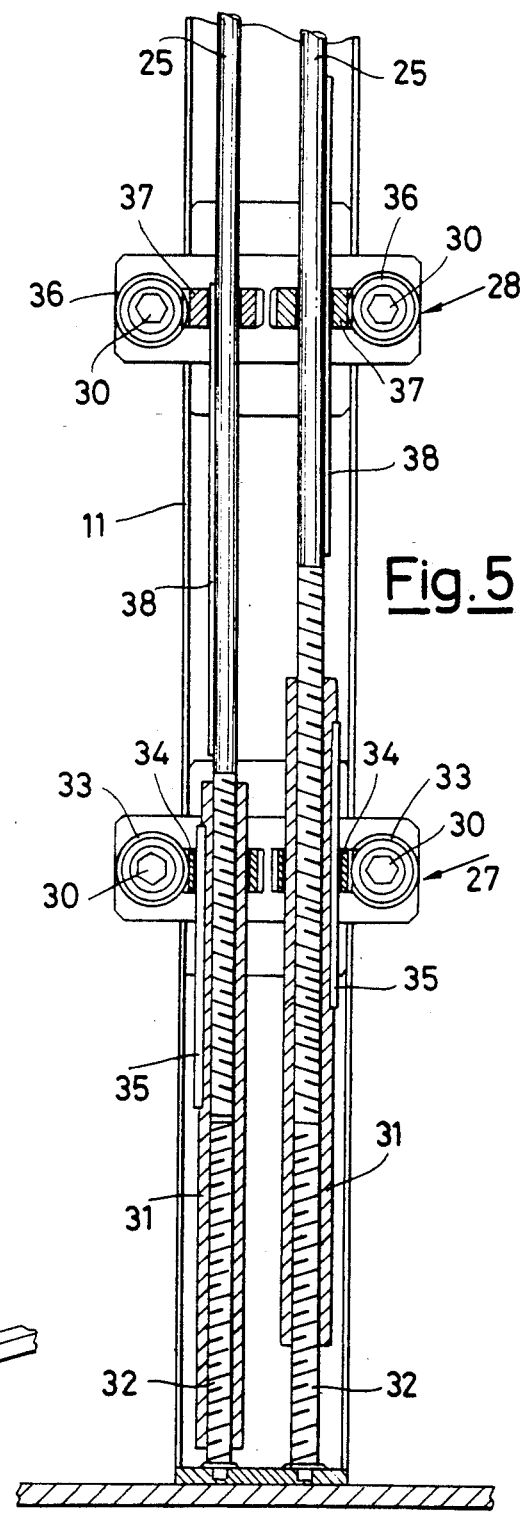

ADJUSTABLE STORAGE RACK

BACKGROUND OF THE INVENTION

Storage racks of the type comprising a plurality of shelves identifying compartments in which elements are to be stored in the form of packages such as cases, boxes, baskets, etc. supported by pallets and which are termed generally load units are known. Handling of the elements from and to the cells of the storage rack or warehouse is performed by lift devices which traverse on tracks along the shelving and have fork means for raising and depositing of the pallets.

Ordinarily the load units cannot be directly stacked to avoid damaging them and because this procedure would give rise to the problem of withdrawal from the warehouse of those load units not located on the top of each stack. It is therefore normal to follow the procedure of using a compartment for each load unit or at most for load units side by side.

To optimize space utilization in the warehouse it is therefore preferable that the space between superposed shelves be just higher than the load unit so that the space between the top of a load unit and the shelf above be minimal. This can be easily provided if the load units are all of the same predetermined height or are in a limited quantity of standard heights and in a foreseeable number so that the warehouse can be laid out in advance with appropriately spaced shelves.

If these conditions cannot be respected, the warehouse must be sized to receive the highest load unit and consequently space utilization in the warehouse decreases as the number of load units of a height less than the maximum increases. Besides warehouses where continuously arriving load units are of variable height, the problem of sizing the compartments is particularly severe for example in warehouses for stocking and distributing seasonal products where the height of the load units changes as the products stored change.

A known solution to the problem applicable to both cases is to provide on the side walls of the compartments small brackets, for support of auxiliary pallets and wider than those usually used with the load units, in such a manner as to provide shelving of an intermediate height by resting an auxiliary pallet on the small brackets. Such a solution results in the problem, however, of having to foresee and store ready for use a number of auxiliary pallets equal to the expected maximum number of load units lower than the maximum height. In addition, enlargement of each compartment to allow insertion of load units on normal pallets without interference with the small support brackets considerably diminishes space utilization in the warehouse. Finally, there must be provided means for handling the auxiliary pallets and this increases the cost of the system.

Another known solution to the problem applicable only to the case of seasonal warehouses is the one which provides movable brackets so as to be able to rearrange the warehouse upon each change of season. This solution however involves stopping operations to perform manual positioning and securing of the brackets and this involves great expenditure of time and huge costs.

The general object of the present invention is to obviate the above mentioned drawbacks by providing a warehouse or storage rack with compartments for load units of varying height and handling means for loading and unloading thereof with means for rapidly adjusting the compartment height to the heights of the load units while optimizing utilization of the warehouse volume.

SUMMARY OF THE INVENTION

In view of said object it has been sought to provide in accordance with the invention a storage rack of the type comprising shelving consisting of a plurality of risers connected by horizontal stringers to individualize an ordered plurality of compartments open at the front and arranged in rows and columns for receiving load units deposited and withdrawn therefrom by means of extractable forks born by a handling device moving along the shelving and positioning itself opposite the individual compartment characterized in that in each compartment are placed at intervals on the side walls pluralities of brackets facing each other in pairs, the brackets being rotatable on pivots by means of operating means acting on complementary elements on the brackets between a raised or rest position virtually parallel to the side wall of the compartment and a virtually horizontal lowered or supporting position, the distance between the facing brackets when they are in the raised position allowing a load unit to pass between them and when they are in the lowered position to rest thereon.

BRIEF DESCRIPTION OF THE DRAWINGS

To further clarify the explanation of the innovative principles of the present invention and its advantages as compared with the known art there is described below with the aid of the annexed drawings possible embodiments as examples applying said principles. In the drawings:

FIG. 1 shows a partial schematic front elevation view of the shelving in the adjustable storage rack of the invention with a corresponding handling device for loading and unloading the load units, FIG. 2 shows a schematic perspective view of the handling device of FIG. 1 with first means of adjustment of the rack, FIG. 5 shows a view of a detail of the device of FIG. 4.

DETAILED DESCRIPTION OF THE INVENTION

Figure 3:
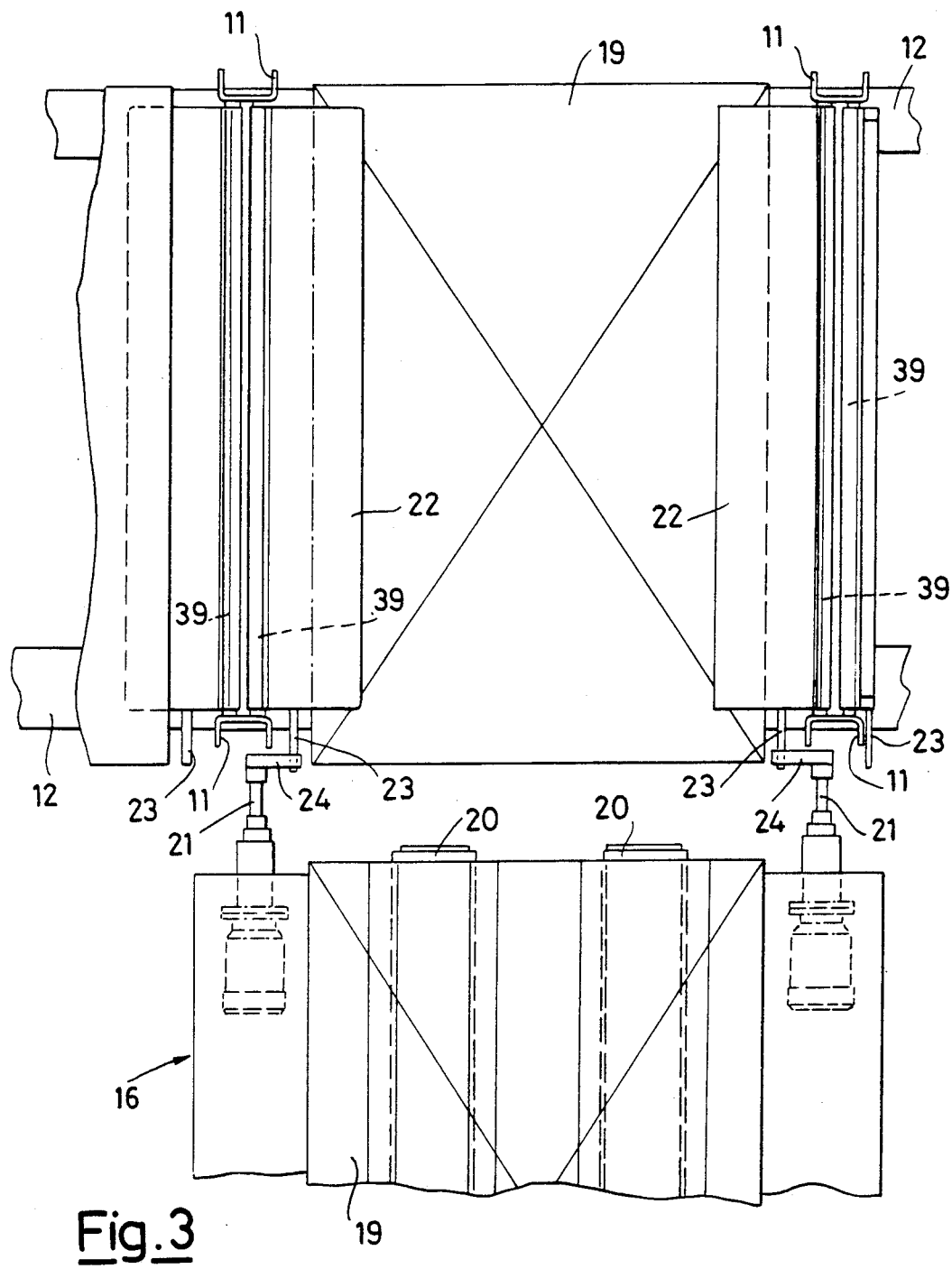
FIG. 3 shows a schematic partial plan view of a compartment of the rack of FIG. 1 during the action of the first means of adjustment of FIG. 2.

With reference to the figures, as shown in FIG. 1 an adjustable storage rack indicated generally by reference number 10 comprises shelving consisting of a plurality of risers 11 connected by horizontal stringers or brackets 12 to individualize a plurality of compartments 13 open at the front.

Parallel to the shelving there moves along upper rails 14 and lower rails 15 a handling device 16 virtually of the known art having a lift 17 running along a vertical guide 18 for loading and unloading of load units 19, 19', 19" of varying height in the compartments by means of extractable forks 20.

In accordance with the invention in each compartment 13 there are at regular intervals movable side brackets 22 facing each other in pairs.

Figure 6:
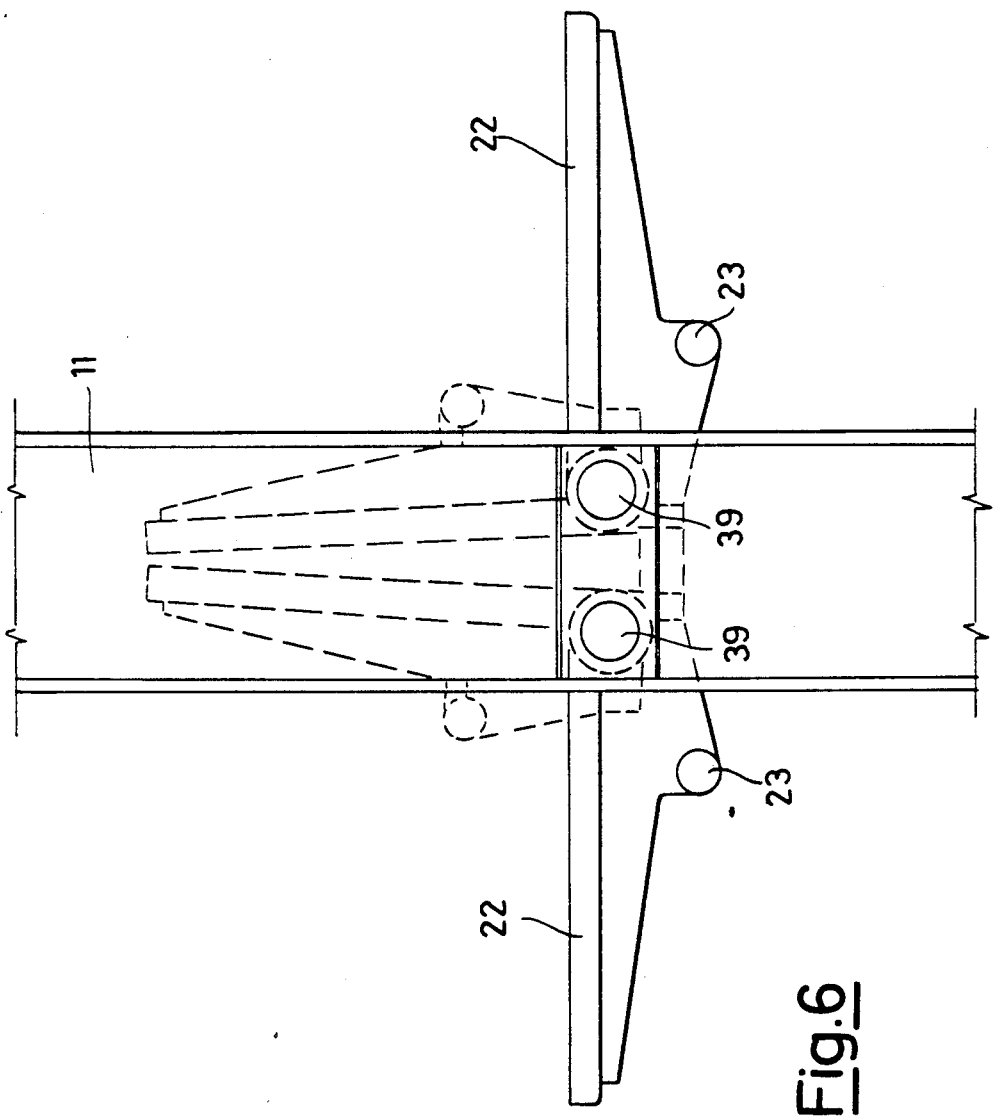
FIG. 6 shows a side elevation view of a detail of the rack of FIG. 1.

As may be seen better in FIG. 6, each bracket 22 is joined by a pin 39 to the corresponding riser 11 separating two adjacent compartments 13 so as to be movable between a raised or out-of-the-way position (shown in broken lines) with minimal projection into the compartment and a lowered or working position (shown in solid lines).

Each bracket has an operating element or pin 23 directed toward the aisle where the device 16 passes. It is thus possible by engaging the pins 23 of the brackets to move them and thus create further divisions of the compartments 13. In this manner it is possible to optimize warehouse space utilization by determining the space between the stringers as the maximum height of the load unit storable in the warehouse and the space between the brackets and between the brackets and the stringers as the minimum height of the load unit acceptable in the warehouse.

For example as shown in FIG. 1 two pairs of brackets can be provided for each compartment so as to permit division thereof in three spaces for low load units 19'', in two spaces for one medium-height load unit 19' and one low load unit 19'', or in a single space for one high load unit 19.

In accordance with one embodiment of the invention, to place the brackets in the working or rest position it is for example advantageous to fit the handling device 16 at the bottom as shown in FIG. 2 (otherwise known) with two powered arm devices 21 rotating axially and terminating with U elements 24 spaced virtually the distance of the pins 23 of facing brackets in a compartment.

As shown in detail in FIG. 3 when the handling device 16 is in front of a compartment, the U elements 24 can engage with the pins 23 of the facing brackets to raise or lower them.

If a load unit to be stored is a unit of maximum height 19 it is placed in a completely empty compartment 13 and the arm devices 21 do not enter into action. But if a load unit shorter than the maximum is to be stored, for example of type 19' or type 19'', it can occupy the empty upper space in a compartment already occupied by one or more load units of total height less than the maximum. The traversing device 16 need only bring the load unit near the empty space and engage the U parts of the arm devices 21 with the pins of the two movable brackets immediately above the upper unit already in the compartment, so as to bring the brackets into the support position and hence ready to receive the new load unit.

Upon withdrawal of a load unit from the warehouse, if it is resting on brackets 22, after the withdrawal operation the device 16 rotates with the arm devices 21 the corresponding brackets to the rest position so as to make the space available for a subsequent storage operation.

Such an embodiment allows maximum flexibility since it is possible to store load units of various heights in an unforeseen number for each type and with the minimal space occupied.

Figure 4:
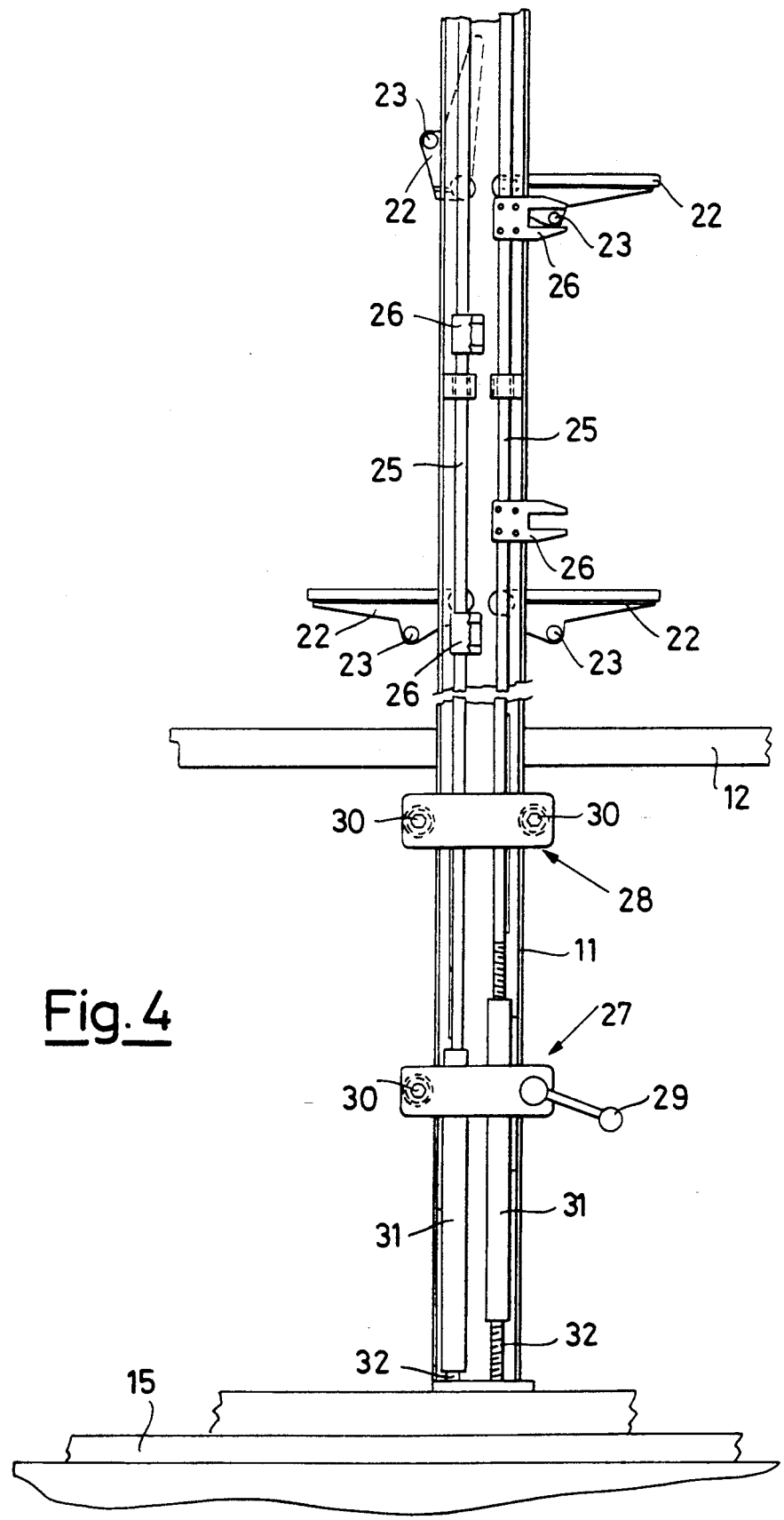
FIG. 4 shows a partial schematic front elevation view of second means of adjustment of the rack of FIG. 1.

FIG. 4 shows a different embodiment applying the innovative principles claimed herewith to achieve positioning of the brackets 22 in a manner other than with 21 on the device 16.

In said figure the same elements as in the previously described embodiment are indicated by the same reference numbers as in the previous figures.

A warehouse virtually of the type shown in FIG. 1 and hence with movable brackets 22 having positioning pins 23 comprises in accordance with the different embodiment described below as shown in FIG. 4, rods 25 placed parallel along each riser 11 and bearing U elements 26 at regular intervals. Said rods run parallel to the risers and are rotatable around their own axis by means of mechanical movement units 27 and 28 operated for example by cranks 29 inserted in hexagonal engagement seats 30.

As may be better seen in FIG. 5, the rods 25 terminate at the bottom with threaded ends to be screwed into threaded sleeves in turn screwed onto threaded pins 32 fixed to the base of the riser 11. The first movement unit 27 comprises a worm gear 33 coupled to a gear 34 in which the corresponding sleeve 31 slides. The sleeve 31 and gear 34 rotate integrally as a result of a guide 35 on the sleeve running in a corresponding seat in the gear 34. The second unit 28 comprises for each rod 25, a worm gear 36 coupled to a gear 37 in which runs the corresponding rod 25. The rod 25 and gear 37 rotate integrally as a result of a guide 38 on the rod running in a corresponding seat in the gear 37.

Thus, when rotating worm gear 33 and gear 34 with a crank 29 engaged in the hexagonal seat 30, the corresponding sleeve rotates screwing onto or off of the pin 32 and simultaneously screwing or unscrewing the rod 25 therein causing it to rise or fall. The fact that the sleeve is screwed onto a threaded pin 32 causes the rod 25 to rise or fall twice the pitch of the thread for each turn of the sleeve. Rotating worm 36, again by means of a crank 29 engaged in the corresponding hexagonal hole 30, the corresponding gear 37 causes rotation of the rod passing therein and movement of the U elements 26 between the working position shown for the rod 25 on the right in FIG. 4 and the rest position shown for the rod 25 on the left in FIG. 4. The space between or pitch of the U elements 26 along the rods 25 is different from the pitch of the brackets 22 along the risers 11, and so as to permit simultaneous engagement of the pins of all the brackets (either all raised or all lowered) occupying the same position in the compartments of an entire column of the warehouse without interfering with the other brackets of the compartments of said column.

If for example as shown in the figures and described as a specific non limiting embodiment, the brackets in each compartment form two shelves, the U elements 26 will be two for each compartment and offset (as shown in FIG. 4) in relation to the brackets so that when each U element 26 near for example the upper bracket of each compartment engages the corresponding movement bracket pin 23 and moves to shift said brackets, the other U elements 26 near the lower brackets of each compartment do not interfere with the movement pins of said lower brackets. In this manner it is possible to simultaneously place in the desired position all the brackets of the same position on one side of the compartments of a column while leaving unchanged the position of the others.

This is very useful in case of seasonal warehouses when at the change of the season it is necessary to rearrange the entire warehouse to receive load units of predetermined height. Said height can have for example with two pairs of brackets per compartment three different values for minimal waste of space and in each column of the warehouse there can be housed load units of two heights chosen among said three heights. In other word each column, depending on the movement unit of the brackets, can receive in each compartment a single load unit of maximum size, one medium-sized load unit 19' and one small load unit 19", or three small load units 19".

Although the invention has been described for a specific embodiment it is evident that many alternatives and variations, such as in materials and dimensions, will be apparent to those skilled in the art in light of the foregoing description. Accordingly, the invention is intended to embrace all of the alternatives and variations that fall within the spirit and scope of the invention. For example, the raising and rotation of the rod 25 can be achieved not only with a manual crank system but with a ratiomotor of the known art coaxial with the worms 33 and 36.

In addition, the sleeve system described for raising the rods can be readily replaced by other known mechanisms. It would also be possible to provide a system similar to the one shown in FIG. 5, but with the sleeve lacking the lower threaded pins, losing the multiplying effect of the number of turns thereof for the purpose of axially moving the rods 25 but simplifying the mechanism since it is no longer necessary to provide the sleeves with the possibility of axial movement but only rotation.

I claim:

1. In a storage rack comprising a plurality of vertical risers and horizontal stringers spaced apart to form a plurality of rows and columns of compartments open at the front and arranged to receive load units from a vertically and horizontally moveable handling device having extractable forks for inserting into and removing therefrom load units from said compartments, the improvement comprising at least one pair of brackets pivotally mounted opposite each other on side walls of each of the compartments and moveable between a vertical, out-of-the-way position where they lie parallel with said side walls and permit a load unit to pass between them and a lowered, working position where they extend into the interior of said compartments to support a load unit therein, each of said brackets having an operating element extending outwardly therefrom and operating means on said handling device for simultaneously engaging the operating elements of a pair of brackets to move said pair of brackets between said positions depending on the size of the load unit to be stored in a compartment.

2. The rack of claim 1, including a plurality of pairs of brackets in each of said compartments.

3. The rack of claim 1, wherein the operating elements on said brackets each comprise a pin projecting outwardly from the fronts of the compartments and offset from the pivot axis of the brackets, and wherein the operating means on the handling device comprises a pair of spaced apart and axially moveable and rotatable arms, each having a fork on the end for engagement with a pin, and means for moving the arms toward and away from engagement with the pins and, after engagement with the pins, for simultaneously rotating the arms to move the brackets between said positions.

* * * * *